M. BEACH.
MOTOR VEHICLE LIGHT.
APPLICATION FILED NOV. 6, 1919.
1,369,953.
Patented Mar. 1, 1921.
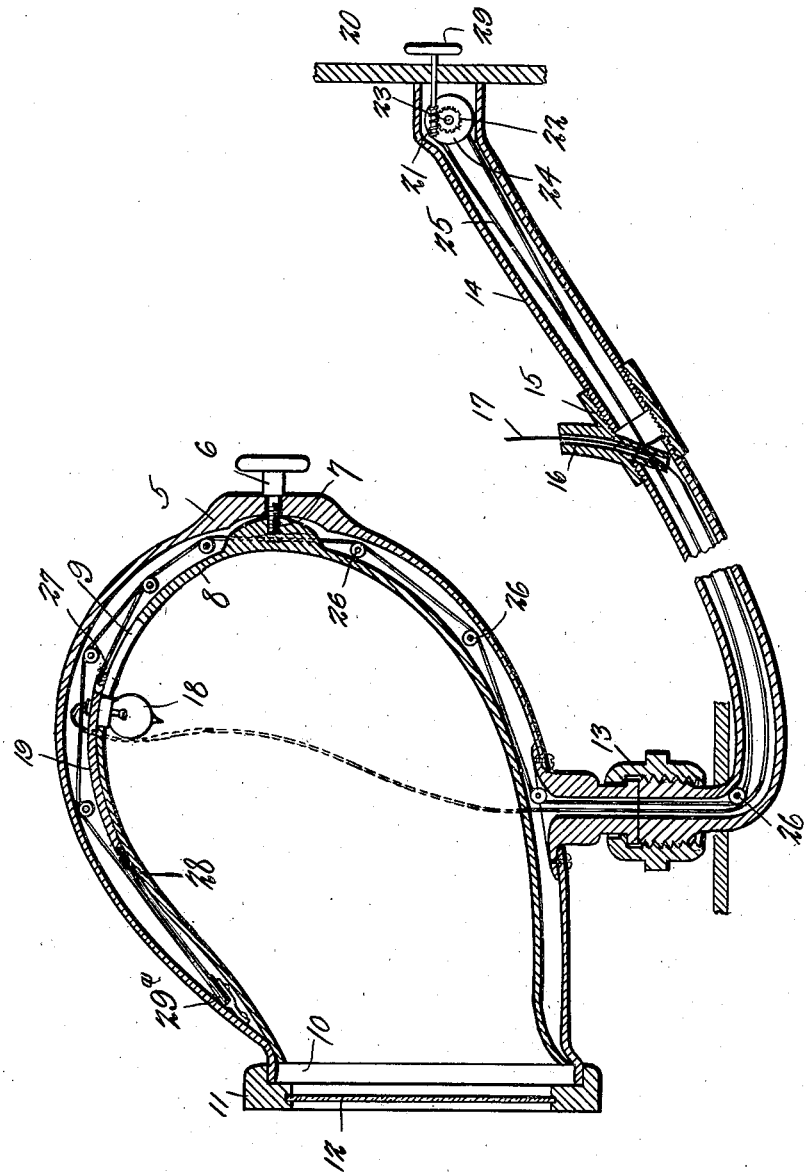

UNITED STATES PATENT OFFICE.

MARIE BEACH, OF EVANSVILLE, INDIANA, ASSIGNOR OF ONE-THIRD TO W. ERNST ROSE AND ONE-THIRD TO EDWARD RUFF, BOTH OF EVANSVILLE, INDIANA.

MOTOR-VEHICLE LIGHT.

1,369,953.   Specification of Letters Patent.   Patented Mar. 1, 1921.

Application filed November 6, 1919. Serial No. 336,172.

*To all whom it may concern:*

Be it known that I, MARIE BEACH, a citizen of the United States of America, and resident of Evansville, in the county of Vanderburg and State of Indiana, have invented certain new and useful Improvements in Motor-Vehicle Lights, of which the following is a specification.

This invention relates to head lights and particularly to those used on automobiles and the like and said invention has for an object the provision of novel means whereby the lamp or light source may be changed in a novel manner with relation to the reflector or lamp body to position said lamp, so that the direct rays or beams of light may be visible from points in front of the head light, or to a position where the lamp or light source is not visible but where the reflector will act to direct said rays to illuminate the road.

A further object of the invention is to provide novel means for holding the lamp or light source in different positions of adjustment; for supplying current to the lamp in such different positions and for effecting the adjustment of the lamp.

A still further object of the invention is to produce a head light which will effectually direct light to the roadway in front of an automobile at different angles according to the adjustment of the parts.

With the foregoing and other objects in view, the invention consists in the details of construction and in the arrangement and combination of parts to be hereinafter more fully set forth and claimed.

In describing the invention in detail reference will be had to the accompanying drawing, illustrating one embodiment of the invention by a vertical sectional view.

In these drawings I have illustrated the invention by a vertical sectional view of a lamp on its mounting.

In these drawings 5 denotes the body of the lamp, having anchoring screw 6 threaded through its rear wall; the said screw being intended to enter a threaded socket 7 formed in the reflector body 8. The reflector 8 has a slot 9 in its upper wall which upper wall is upwardly curved from the rear and then downwardly curved to the opening 10 where the light is visible. The front of the body 5 may have the usual lens frame 11 and lens 12, but as these elements do not form a part of the invention they are conventionally shown only.

A coupling or fitting 13 is employed for connecting the body of the headlight to the bracket or hollow arm 14 and the said bracket has a joint 15 which has a duct 16 for the passage of the conductors 17 of electricity, the said conductors being threaded through the duct 16 and through the hollow bracket and coupling to the interior of the body 5 and to one side of the reflector body to the lamp 18 which is appropriately fitted on the sliding plate 19, which is movable (in a manner to be presently explained) longitudinally of the top of the reflector so that the lamp may be carried rearwardly and downwardly, or forwardly and upwardly, according to the lighting effect to be produced; it being understood that when the lamp is lower at the rear the rays or light from the lamp will be directed more nearly horizontally, whereas, if the lamp is in the position shown in the drawings the lamp will not be visible through the opening at the front and only the reflected rays of light will be shown through the lens. This provision for adjusting the position of the lamp makes it possible for the user to prevent the emanation of blinding light, although the lighting effect can be increased by moving the lamp rearwardly.

As a means for effecting the adjustment, the bracket 14 may be attached to any anchoring means 20 and a worm 21 mounted to rotate in the said bracket. A worm wheel 22 is mounted on shaft 23 carried by the bracket and a sheave pulley 24 may be mounted on the shaft to take motion from the worm wheel so that as the worm wheel is rotated in opposite directions, like motion will be communicated to the sheave pulley. A cable 25 may be connected to be operated by the rotation of the sheave pulley and the said cable is run over idlers 26 the number of which may be increased or diminished acording to the requirements.

One end 27 of the said cable is connected to the rear end of the sliding plate, whereas, the other end 28 of the said cable may be connected to the forward end of the sliding plate so that the manipulation of a hand wheel 29 connected to the worm 21, the sheave pulley may be rotated to pull the sliding plate rearwardly or to pull it forwardly, it being understood that the cable will compensate for this movement by being wound and unwound with respect to the said sheave pulley.

Another portion of the cable which is connected to the forward end of the sliding plate is run over a pulley 29ª anchored to the lamp body 5 at its forward end and to the upper wall thereof.

As the description of the operation of the parts and the function of the device as a whole has been given, it is believed unnecessary to supply a résumé of the operation of the said device.

The outer casing should, of course, be made of jointed sections secured together in an appropriate manner to form a housing or casing for the interior mechanism.

I claim:

1. In a head light, a lamp body, a reflector therein having an opening in its wall, a member slidable with relation to the wall, a lamp carried by said member projecting through the opening in the reflector, a rotatable member, a cable wound thereon, said cable having ends, one of which is connected to one end of the slidable member and the other end connected to the opposite end of the slidable member, and means for rotating the rotatable member.

2. In a head light, a lamp body, a reflector therein having an opening in its wall, a member slidable with relation to the wall, a lamp carried by said member projecting through the opening in the reflector, a rotatable member, a cable wound thereon, said cable having ends, one of which is connected to one end of the slidable member, and the other end connected to the opposite end of the slidable member, a worm wheel connected to the rotatable member, and a worm engaging the worm wheel for rotating it.

3. In a head light, a lamp body, a reflector therein having an opening, said reflector having a curved wall, a member slidable over the said curved wall, a lamp carried by said member projecting through the opening of the said reflector, a conductor of electricity between the lamp body and the reflector connected to the said lamp, a hollow bracket connected to the lamp by a hollow coupling associated with the bracket through which the conductors of electricity pass, and means for operating the movable member with respect to the reflector.

MARIE BEACH.